United States Patent
Thomas et al.

(10) Patent No.: US 6,650,161 B2
(45) Date of Patent: Nov. 18, 2003

(54) CLOCK DISTRIBUTION NETWORK HAVING REGULATED POWER SUPPLY

(75) Inventors: Thomas P. Thomas, Hillsboro, OR (US); Ian A. Young, Portland, OR (US)

(73) Assignee: Intel Corporation, Santa Clara, CA (US)

(*) Notice: Subject to any disclaimer, the term of this patent is extended or adjusted under 35 U.S.C. 154(b) by 125 days.

(21) Appl. No.: 09/751,942

(22) Filed: Dec. 28, 2000

(65) Prior Publication Data

US 2002/0084821 A1 Jul. 4, 2002

(51) Int. Cl.[7] .................................................. H03K 3/00
(52) U.S. Cl. ........................ 327/291; 327/551; 327/293
(58) Field of Search ............................ 327/291, 293, 327/295, 551, 34; 363/39

(56) References Cited

U.S. PATENT DOCUMENTS

| | | | | |
|---|---|---|---|---|
| 5,051,630 A | * | 9/1991 | Kogan et al. ............... | 307/603 |
| 5,442,304 A | * | 8/1995 | Wong et al. ................. | 326/17 |
| 5,627,736 A | * | 5/1997 | Taylor ......................... | 363/39 |
| 5,929,679 A | * | 7/1999 | Ohwada ..................... | 327/206 |
| 6,111,448 A | * | 8/2000 | Shibayama ................. | 327/293 |
| 6,154,100 A | * | 11/2000 | Okamoto .................... | 327/288 |
| 6,229,861 B1 | * | 5/2001 | Young ........................ | 375/356 |

* cited by examiner

Primary Examiner—Dinh T. Le
(74) Attorney, Agent, or Firm—Blakely, Sokoloff, Taylor & Zafman LLP

(57) ABSTRACT

A clock distribution network for an integrated circuit is disclosed. The network includes a plurality of inverters that distribute a clock signal. The inverters are powered by a power supply. The power supply is supplied to the inverters through a source follower transistor that has its gate connected to a regulated DC voltage. The source follower transistor operates in the saturation region.

5 Claims, 2 Drawing Sheets

CLOCK DISTRIBUTION NETWORK HAVING REGULATED POWER SUPPLY

TECHNICAL FIELD OF INVENTION

The present invention relates generally to integrated circuit clocking, and more specifically, to distributing a clock throughout an integrated circuit system.

BACKGROUND OF THE INVENTION

An issue facing the integrated circuit industry today is the problem of distributing clock signals throughout integrated circuit systems and integrated "circuit dies with minimal clock delay variation and jitter. One source of clock "; "variation and jitter is noise in the power supply to the inverters that drive the"; and clock signal throughout the integrated circuit. Currently, the amount of clock delay variation and jitter due to power supply noise is dealt with by lowering the maximum chip operating frequency to provide a higher margin for clock delay variation and jitter. Stated another way, because of the clock delay variation and jitter, the maximum operating frequency of the integrated circuit is reduced. Thus, by lowering the amount of clock delay variation and jitter, the maximum operating frequency of the integrated circuit can be increased.

In a conventional clock distribution network, a series of inverters are used, increasing in size, to drive the capacitance of the clock load starting at the clock generator circuit. One example of such a clock distribution network is described in U.S. Pat. No. 6,037,822 to Rao et al. and assigned to the same assignee as the present invention. In the '822 patent, inverters are used to drive a clock signal through an "H-tree" clock distribution system. Typically, the inverters are connected directly to the power supply of the integrated circuit. Noise in the power supply affects the performance of the inverters and results in clock variation and jitter at the peripheral boundaries of the clock distribution network. This tends to lower the maximum chip operating frequency. Specifically, as seen in FIG. 1, a power supply $V_{cc}$ 101 powers an inverter 103. The inverter 103 is one of many inverters that form the clock distribution network. As seen in FIG. 1, the power supply 101 is connected directly to the inverter 103. It has been found that this direct connection of the power supply to the inverter 103 results in clock delay variation and jitter, if there is noise on the power supply.

DETAILED DESCRIPTION

Methods and apparatus' for distributing a clock signal in a system are disclosed. A subject of the invention will be described with reference to numerous details set forth below, and the accompanying drawings will illustrate the invention. The following description and the drawings are illustrative of the invention and are not to be construed as limiting the invention. Numerous specific details are described to provide a thorough understanding of the present invention. However, in certain instances, well known, or conventional details are not described in order not to obscure the present invention in detail.

Very large scale integration (VLSI) chips have an internal clock. The internal clock is an important part of the operation of the chip because various operations on the chip are synchronized to the internal clock. As the operational frequency of the chip increases, the length of the clock cycle (also known as a cycle time) decreases. It is thus extremely important that the internal clock be distributed via a clock distribution network with a minimal amount of jitter and delay variation.

As alluded to above, the clock signals are typically routed to various clocked circuit elements within a large circuit through a clock distribution network. The clock distribution network of an integrated circuit contains a series of inverters, increasing in size, to drive the large capacitance of the clock load starting from a clock generation circuit. In general, large drivers or buffers capable of providing large currents are used by the network to transmit the clock signals to the clocked circuit elements. The drivers almost always include an inverter. One source of clocked delay variation and jitter is that of noise from a power supply to the inverters. The present invention minimizes the clock delay variation and jitter due to power supply noise.

Figure 1:
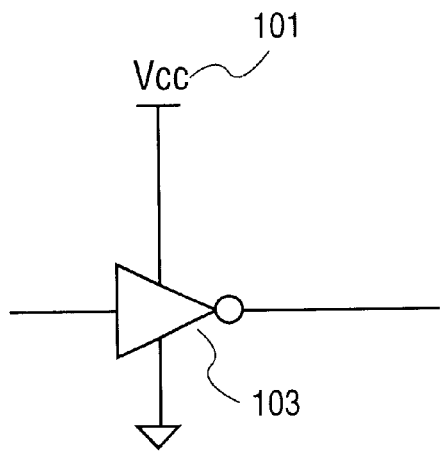
FIG. 1 is a schematic diagram of a portion of a clock distribution network formed in accordance with the prior art.
Figure 2:
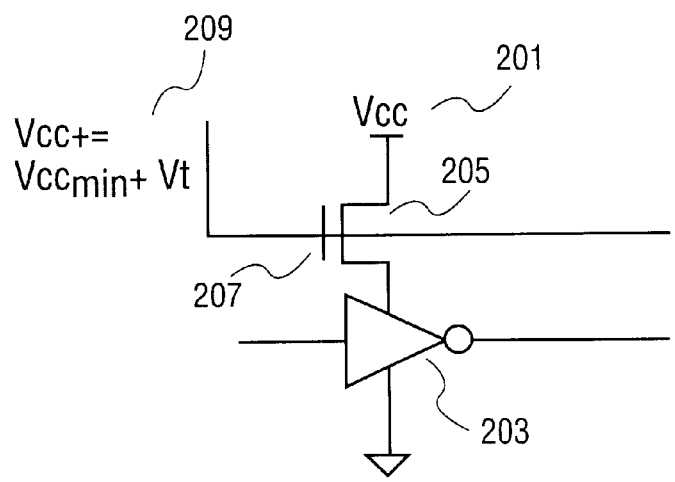
FIG. 2 is a schematic diagram of a portion of a clock distribution network formed in accordance with the present invention.

Turning to FIG. 2, a portion of a clock distribution network is shown. The clock distribution network includes a power supply 201 and an inverter 203. Additionally, a source follower transistor 205 is placed between the power supply 201 and the inverter 203. The source follower transistor 205 regulates the power supply. The gate 207 of the source follower transistor 205 is connected to a regulated voltage $V_{cc+}$ 209. The regulated voltage $V_{cc+}$ is equal to the minimum "regulated voltage $V_{cc+}$ 209. The regulated voltage $V_{cc+}$ 209 is equal to the minimum"follower transistor 205. Note that because the source follower transistor 205 has its gate connected to a regulated voltage $V_{cc+}$ 209, and the gate draws little or no current, the regulated voltage $V_{cc+}$ 209 is extremely stable. This is in contrast to the approach where a regulated voltage is used directly by the inverters. In such a case, as the inverters draw current from the power supply, a voltage droop will take place, causing noise in the power supply.

The inclusion of the source follower transistor 205 results in a stable power supply being provided to the inverter 203. This significantly reduces the delay variation and jitter of the clock signal caused by noise in the power supply. This in turn allows the maximum chip operating frequency, i.e. the clock frequency, to be increased.

In operation, the source follower transistor 205 is operating in the saturation region. Thus, the source follower transistor 205 is always on and can serve to significantly reduce noise variations in the power supply voltage. Further, no current is drawn from the $V_{cc+}$ 209 in steady state. Because the gate of the source follower transistor 205 is held to a threshold voltage higher than nominal $V_{cc}$, the input to the inverter from the source follower transistor 205 is held consistently near $V_{cc}$. Thus, the source follower transistor 205 provides sufficient isolation from the noise and the power supply 201. Since no current is drawn from $V_{cc+}$ 209 during steady state and there is no rate of change in the current, the signal $V_{cc+}$ 209 can be easily generated and routed to other inverters in the clock distribution network, like a DC reference voltage signal. Moreover, because the inverter 203 receives a supply voltage that is very close to $V_{cc}$ after the source follower 205, the speed or duty cycle of the inverter 203 is not degraded.

Figure 3:
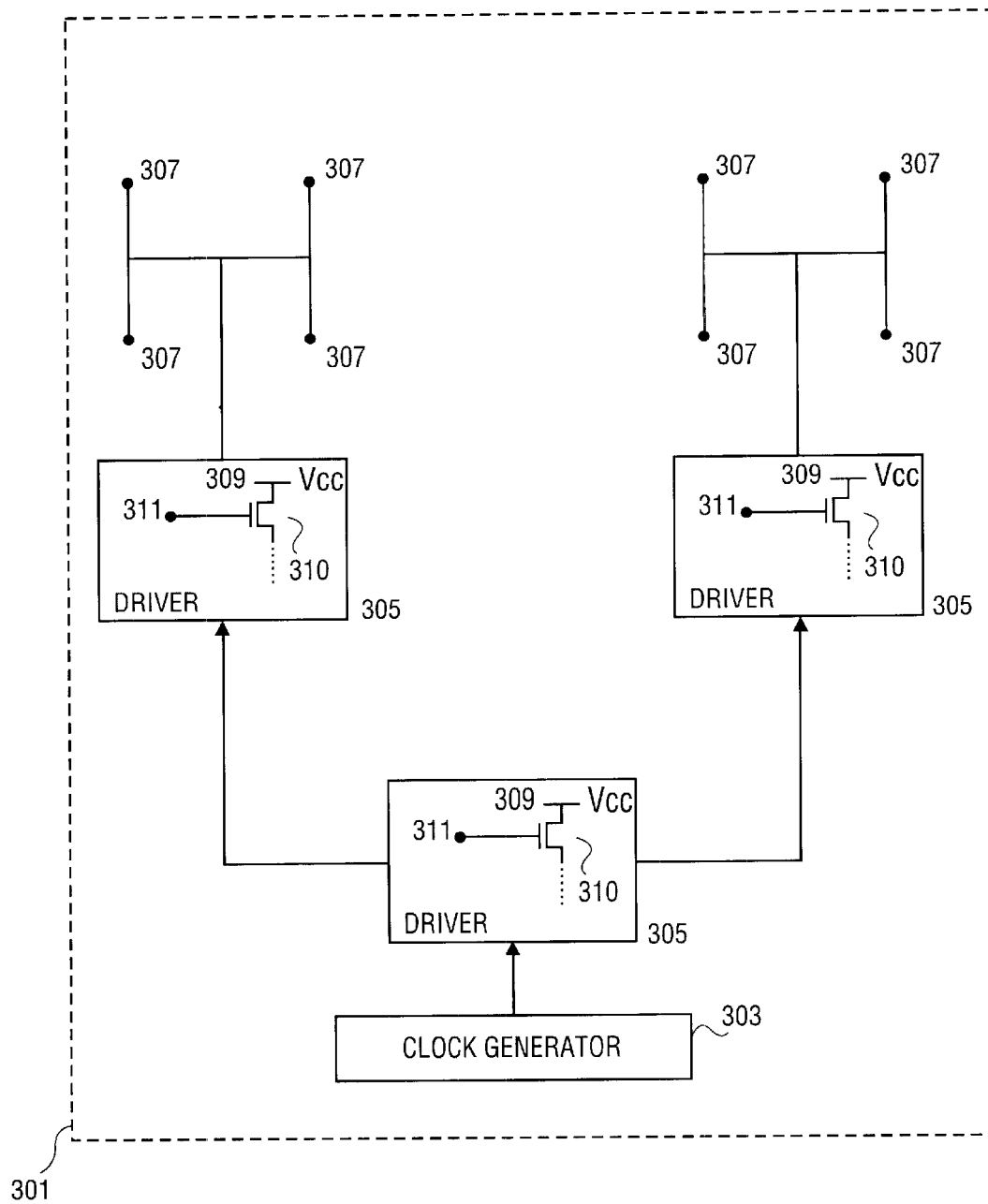
FIG. 3 is a schematic diagram of an integrated circuit formed in accordance with the present invention.

An integrated circuit 301 that incorporates the teachings of the present invention is shown in FIG. 3. Specifically, the integrated circuit 301 includes a clock generator 303, drivers 305, circuit nodes 307, power supply rail 309, and regulated voltage $V_{cc+}$ 311. It can be appreciated that other components/devices common to complex integrated circuits are not shown for clarity. In operation, the clock generator 303 generates a clock signal for distribution to the circuit nodes 307. The circuit nodes 307 use the clock signals for control of their operation. The clock signals are distributed through the drivers 305. The drivers in turn distribute the clock signal through, in this specific embodiment, an H-tree architecture to the circuit nodes 307.

The drivers 305 include one or more inverters that are powered by a power supply 309. As seen in FIG. 3, the power supply 309 supplies power to the drivers 305 (e.g. inverters) through source follower transistors 310 that are turned on by the regulated voltage $V_{cc+}$ 311.

The foregoing describes the present invention using complementary metal oxide semiconductor (CMOS) technology. However, it can be appreciated that the method of the present invention may be used with other families of integrated circuits. For example, the present invention may be implemented using bipolar technology by substituting a bipolar transistor in bipolar-emitter follower configuration for the source follower transistor 205.

While specific embodiments and applications of the present invention have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present invention disclosed herein without departing from the spirit and scope of the invention.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A clock distribution network comprising:

a clock generator to generate a clock signal;

at least one driver coupled to receive the clock signal, the driver having at least one inverter and at least one source follower transistor, the source follower transistor having a source, a drain, and a gate;

a first power supply to supply a power supply voltage level;

a second power supply to supply a regulated voltage level, the regulated voltage level being equal to a minimum voltage level of the power supply voltage level plus a threshold voltage level of the source follower transistor, wherein the source follower source is coupled to receive the supply voltage, the source follower gate is coupled to receive the regulated voltage, and the source follower drain is coupled to provide a third voltage level to the inverter, the third voltage level being approximately equal to the power supply voltage; and a plurality of nodes coupled to the driver to receive the clock signal.

2. The network of claim 1 wherein said source follower is biased to operate in a saturation region.

3. The network of claim 1 wherein said source follower is a bipolar transistor in bipolar-emitter follower configuration.

4. A method comprising:

applying a clock signal from a clock distribution network to a driver having at least one inverter and at least one source follower transistor, the source follower transistor having a source, a drain, and a gate to an inverter;

applying a power supply voltage level to the source follower source;

applying a regulated voltage level to the source follower gate, the regulated voltage level being equal to a minimum voltage level of the power supply voltage level plus a threshold voltage level of the source follower transistor; and applying a voltage level approximately equal to the power supply voltage level to the inverter from the source follower drain.

5. The method of claim 4, further comprising operating the source follower transistor in the saturation region.

* * * * *

UNITED STATES PATENT AND TRADEMARK OFFICE
CERTIFICATE OF CORRECTION

PATENT NO. : 6,650,161 B2
DATED : November 18, 2003
INVENTOR(S) : Thomas et al.

It is certified that error appears in the above-identified patent and that said Letters Patent is hereby corrected as shown below:

Column 1,
Line 14, before "circuit dies", delete " " ".
Line 15, after "source of clock", delete " " ".
Line 16, before "variation", delete " " ".
Line 17, after "drive the", delete " " ".

Column 2,
Line 35, after "$V_{cc+}$", insert -- 209 --.
Lines 36 and 37, delete "regulated voltage $V_{cc+}$ 209. The regulated voltage $V_{cc+}$ 209 is equal to the minimum" and insert -- voltage of the chip power supply 201 plus a threshold voltage of the source --.

Signed and Sealed this

Fifteenth Day of November, 2005

JON W. DUDAS
*Director of the United States Patent and Trademark Office*